United States Patent
Raghavan et al.

(10) Patent No.: US 10,819,448 B2
(45) Date of Patent: Oct. 27, 2020

(54) DETECTION AND MITIGATION OF ANTENNA ELEMENT FAILURES

(71) Applicant: QUALCOMM Incorporated, San Diego, CA (US)

(72) Inventors: Vasanthan Raghavan, West Windsor Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/144,681

(22) Filed: Sep. 27, 2018

(65) Prior Publication Data
US 2019/0149249 A1    May 16, 2019

Related U.S. Application Data

(60) Provisional application No. 62/586,089, filed on Nov. 14, 2017.

(51) Int. Cl.
*H04B 17/12* (2015.01)
*H01Q 21/00* (2006.01)
(Continued)

(52) U.S. Cl.
CPC ......... *H04B 17/12* (2015.01); *H01Q 21/0025* (2013.01); *H04B 7/0469* (2013.01);
(Continued)

(58) Field of Classification Search
CPC .... H04B 7/0478; H04B 7/0639; H04B 17/12; H04B 17/102; H04B 17/17; H04B 17/0085; H01Q 21/0025; H04W 24/06
See application file for complete search history.

(56) References Cited

U.S. PATENT DOCUMENTS 6,140,976 A * 10/2000 Locke ................... H01Q 3/267
                                                              342/173
2008/0261535 A1* 10/2008 Weil ....................... H04B 17/17
                                                              455/67.11
(Continued)

FOREIGN PATENT DOCUMENTS

EP          3038203 A1    6/2016
EP          3285450 A1    2/2018
WO      2016165266 A1   10/2016

OTHER PUBLICATIONS

International Search Report and Written Opinion—PCT/US2018/053560—ISA/EPO—dated Dec. 13, 2018.

*Primary Examiner* — Jaime M Holliday
(74) *Attorney, Agent, or Firm* — Arent Fox, LLP

(57) ABSTRACT

In order to address the potential for antenna failure in large antenna arrays, a method, a computer-readable medium, and an apparatus are provided for wireless communication, e.g., at a base station or CPE. The apparatus detects a failure of a plurality of antenna elements in an antenna array associated with an antenna module in an antenna array comprising a plurality of antenna modules. The apparatus then applies a mitigation procedure in response to detecting the failure, e.g., when a fraction of antenna elements for which a failure is detected meets a threshold. The mitigation procedure may include any of switching to a different codebook, increasing DL or UL transmission power, or a VGA. The failure may be detected by transmitting pilot signals using sets of antenna elements of the antenna array and using signal strength measurements to detect antenna element failures.

20 Claims, 12 Drawing Sheets

(51) Int. Cl.
      *H04B 17/17*       (2015.01)
      *H04W 24/06*     (2009.01)
      *H04B 17/10*       (2015.01)
      *H04B 17/00*       (2015.01)
      *H04B 7/06*         (2006.01)
      *H04B 7/0456*     (2017.01)
      *H04W 52/24*     (2009.01)
      *H04W 52/52*     (2009.01)
      *H04B 17/14*       (2015.01)
      *H04B 17/318*     (2015.01)
      *H04W 24/02*     (2009.01)

(52) U.S. Cl.
      CPC ......... *H04B 7/061* (2013.01); *H04B 17/0085* (2013.01); *H04B 17/102* (2015.01); *H04B 17/14* (2015.01); *H04B 17/17* (2015.01); *H04B 17/318* (2015.01); *H04W 24/06* (2013.01); *H04W 52/245* (2013.01); *H04W 52/52* (2013.01); *H04B 7/0632* (2013.01); *H04B 7/0641* (2013.01); *H04W 24/02* (2013.01)

(56) References Cited

U.S. PATENT DOCUMENTS

| | | | | |
|---|---|---|---|---|
| 2009/0117894 A1* | 5/2009 | Kogure | ................ | H04W 52/42 |
| | | | | 455/424 |
| 2013/0344831 A1* | 12/2013 | Yuan | ................... | H04W 24/04 |
| | | | | 455/226.2 |
| 2015/0003442 A1* | 1/2015 | Sun | ....................... | H04W 16/02 |
| | | | | 370/350 |
| 2019/0052345 A1* | 2/2019 | Yunoki | ................. | H04W 16/28 |

* cited by examiner

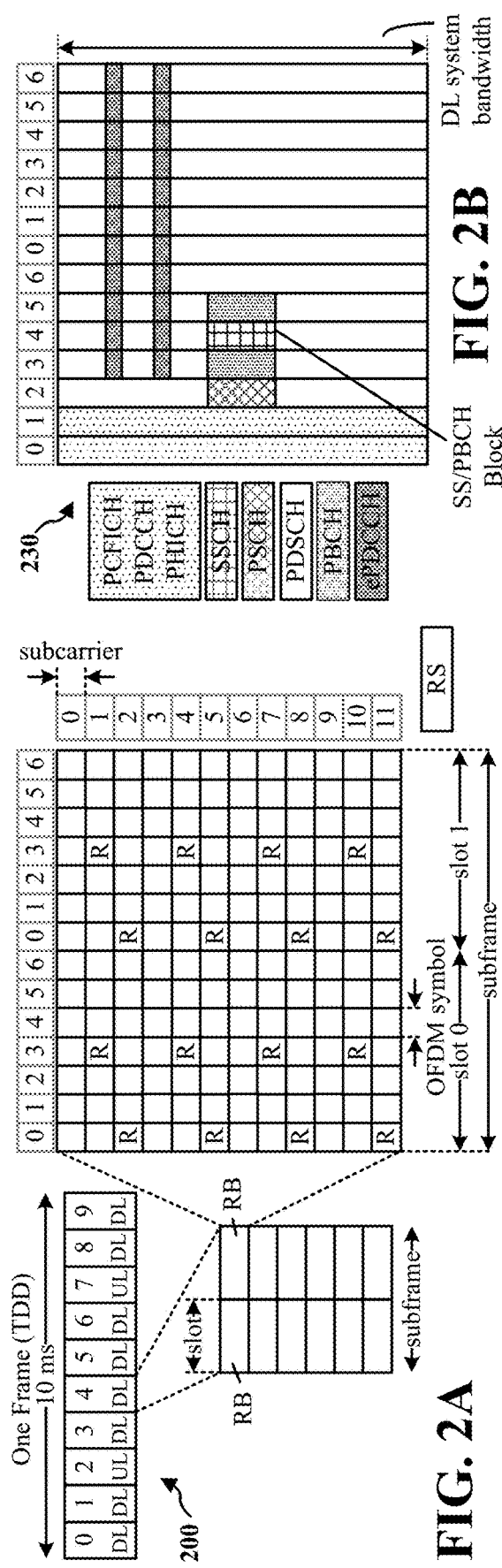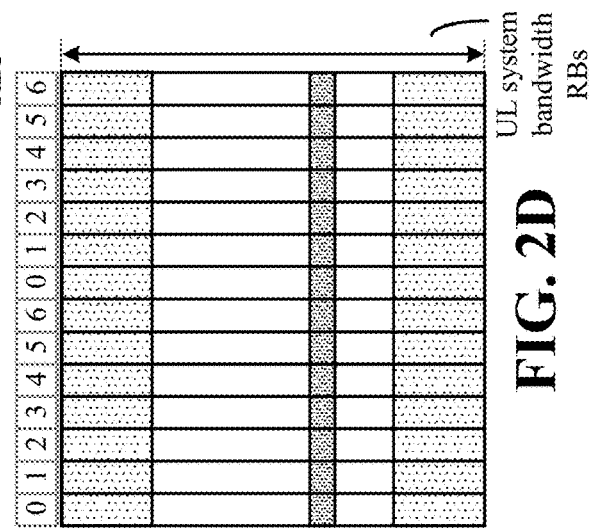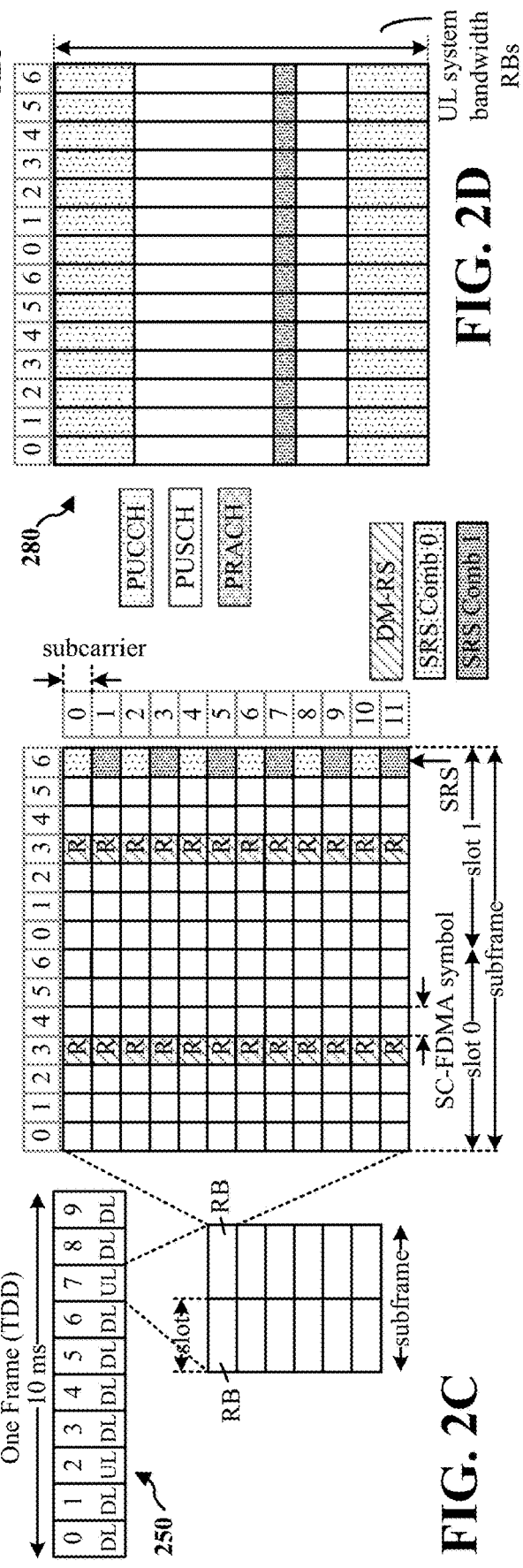
FIG. 2A   FIG. 2B   FIG. 2C   FIG. 2D

DETECTION AND MITIGATION OF ANTENNA ELEMENT FAILURES

CROSS-REFERENCE TO RELATED APPLICATION

This application claims the benefit of U.S. Provisional Application Ser. No. 62/586,089, entitled "Detection and Mitigation of Antenna Element Failures" and filed on Nov. 14, 2017, which is expressly incorporated by reference herein in its entirety.

BACKGROUND

Technical Field

The present disclosure relates generally to communication systems, and more particularly, to mitigation of antenna element failures.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Antenna arrays may be used for wireless communication, e.g., at a base station, a User Equipment (UE), Customer Premises Equipment (CPE), etc. Ideally, all antennas of the antenna array should function correctly, enabling communication up to full/peak Power Amplifier (PA) control. However, in practice, certain antennas in the antenna array may fail. Antenna arrays may be composed of smaller antenna modules. For example, an antenna array of 32×8 antennas may be assembled using smaller antenna modules (e.g., antenna modules having a size such as 4×4, 2×4, 2×2, etc.). Antenna failures, e.g., in a modular construction of antenna arrays, may disrupt ongoing wireless communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Ideally, all antennas of an antenna array should function correctly, enabling communication up to full/peak Power Amplifier (PA) control. However, in practice, certain antennas in the antenna array may fail. The antenna elements may fail for any number of reasons. For example, variable gain amplifiers (VGAs) of certain antennas may fail, radio frequency integrated circuit (RFIC) may not be functioning at a certain point in time, components may age and fail with time, etc. Due to the modular construction of antenna arrays in mmW systems, any of the base station's antennas may fail. Similarly, antenna elements at a Customer Premises Equipment (CPE) may fail. It can be disruptive to ongoing communication to wait for faulty antennas/modules to be fixed.

Aspects presented provide detection and mitigation strategies for antenna failures within an antenna array. For example, a base station or CPE may use assistance from a receiver to detect antenna failure in an antenna array. The base station may use signal measurement information for a pilot signal from a receiver to detect the failure. For example, the base station or CPE may transmit a pilot signal using sets of antenna elements within the antenna array. The base station or CPE may then use signal measurement information, e.g., Reference Signal Received Power (RSRP) measurements, reported from a receiver to monitor for antenna failure. A differential between RSRP measurements for the pilot signals and/or a variation across RSRP measurements may indicate the failure to the base station or CPE. The base station or CPE may then apply a mitigation operation.

In an aspect of the disclosure, a method, a computer-readable medium, and an apparatus are provided for wireless communication, e.g., at a base station or CPE. The apparatus detects a failure of at least one antenna element associated with antenna module in an antenna array, the antenna array comprising a plurality of antenna modules. The apparatus then applies a mitigation procedure in response to detecting the failure.

The mitigation procedure may comprise switching to a different codebook, e.g., based on an amount of antenna elements for which the failure is detected. For example, the base station or CPE may switch to a different codebook when a fraction of antenna elements for which a failure is detected meets a threshold. The mitigation procedure may include increasing at least one of a VGA or a transmission power level for downlink transmissions at the base station. The mitigation procedure may include indicating to a user equipment to increase a transmission power level for uplink transmissions Detecting the failure in the antenna array may comprise transmitting a first pilot signal using a first set of antenna elements in the antenna array, transmitting a second pilot signal using a second set of antenna elements in the antenna array, and receiving at least one signal strength measurement based on the first pilot signal and the second pilot signal. The failure may be detected based on the received signal strength measurement. The second set of antenna elements may comprise a subset of the first antenna elements and may comprise a single antenna element. The received signal strength measurement may comprise a differential between a first signal strength measurement for the first set of antenna elements and a second signal strength measurement for the second set of antenna elements. In another example, the two sets of antenna elements may include the same number of antenna elements and the first set of antenna elements comprises different antenna elements than the second set of antenna elements. In this example, the failure may be detected by monitoring the received signal strength measurements for variations across pilot signals.

In an aspect of the disclosure, a method, a computer-readable medium, and an apparatus are provided for wireless communication at a UE. The apparatus receives a first pilot signal from a base station transmitted using a first set of antenna elements in the antenna array and receives a second pilot signal from the base station transmitted using a second set of antenna elements in the antenna array. The UE then determines a differential signal strength measurement to the base station based on the first pilot signal and the second pilot signal and transmits the differential signal strength measurement to the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

DETAILED DESCRIPTION

Figure 1:
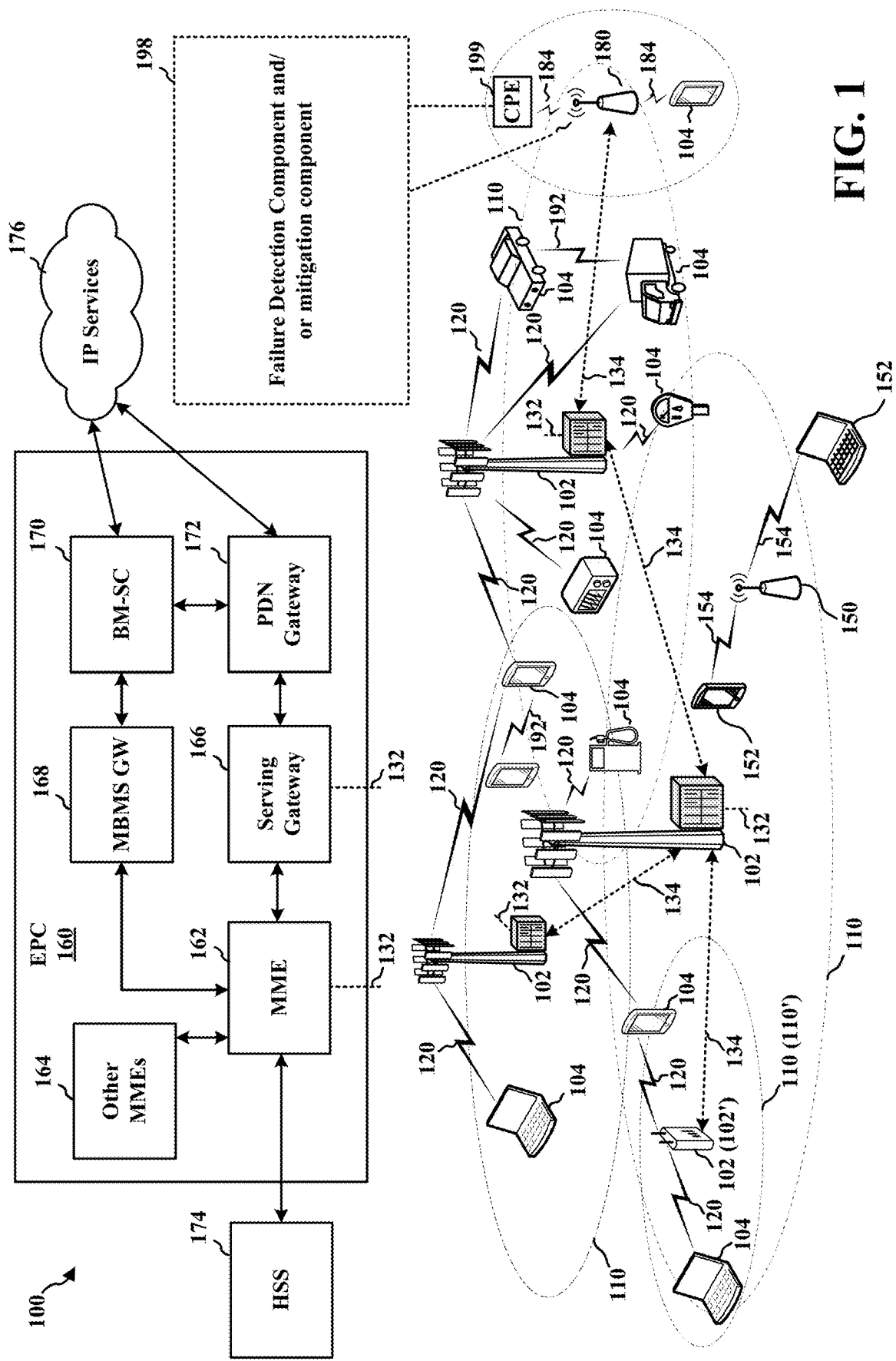
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 and/or CPE 199 may be configured to include a failure detection component and/or a mitigation component 198 that detects failure of antenna elements within an antenna array, e.g., as described in connection with FIGS. 5-12. A CPE may comprise a device located at a customer's premises and may assist with communications at or within the premises, e.g., within a building or at a particular location. In contrast to a user equipment (UE) such as a mobile telephone, a CPE is characterized by considerably lower or no mobility, lesser obstruction due to hand or other blockages from within the ambient environment, higher tolerable cost per unit that allows more infrastructure or complex radio frequency circuitry to be configured, etc. One particular ramification of the higher tolerable circuitry includes more antennas within an antenna array (e.g., 16×4, 32×2, 8×8, 64×4, etc.) unlike a UE (e.g., 2×2, 4×1, 2×1, 8×1, 4×2, etc.). In an example in which the premises is a building, the CPE may communicate (transmit or receive) with (a) UE(s) in the building, e.g., based on mmW communication. The CPE may also provide access for the UE(s) in the building to other service providers (e.g., backbone, Internet gateway, etc.). In one example, the CPE may operate as a router for communication within the building. The CPE may not be limited by mobile contractor restraints. As presented herein, the CPE may communicate using mmW based communication and may comprise multiple antenna modules. As well, component 198 may perform a mitigation procedure based on a detected failure of at least one antenna element.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^\mu*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
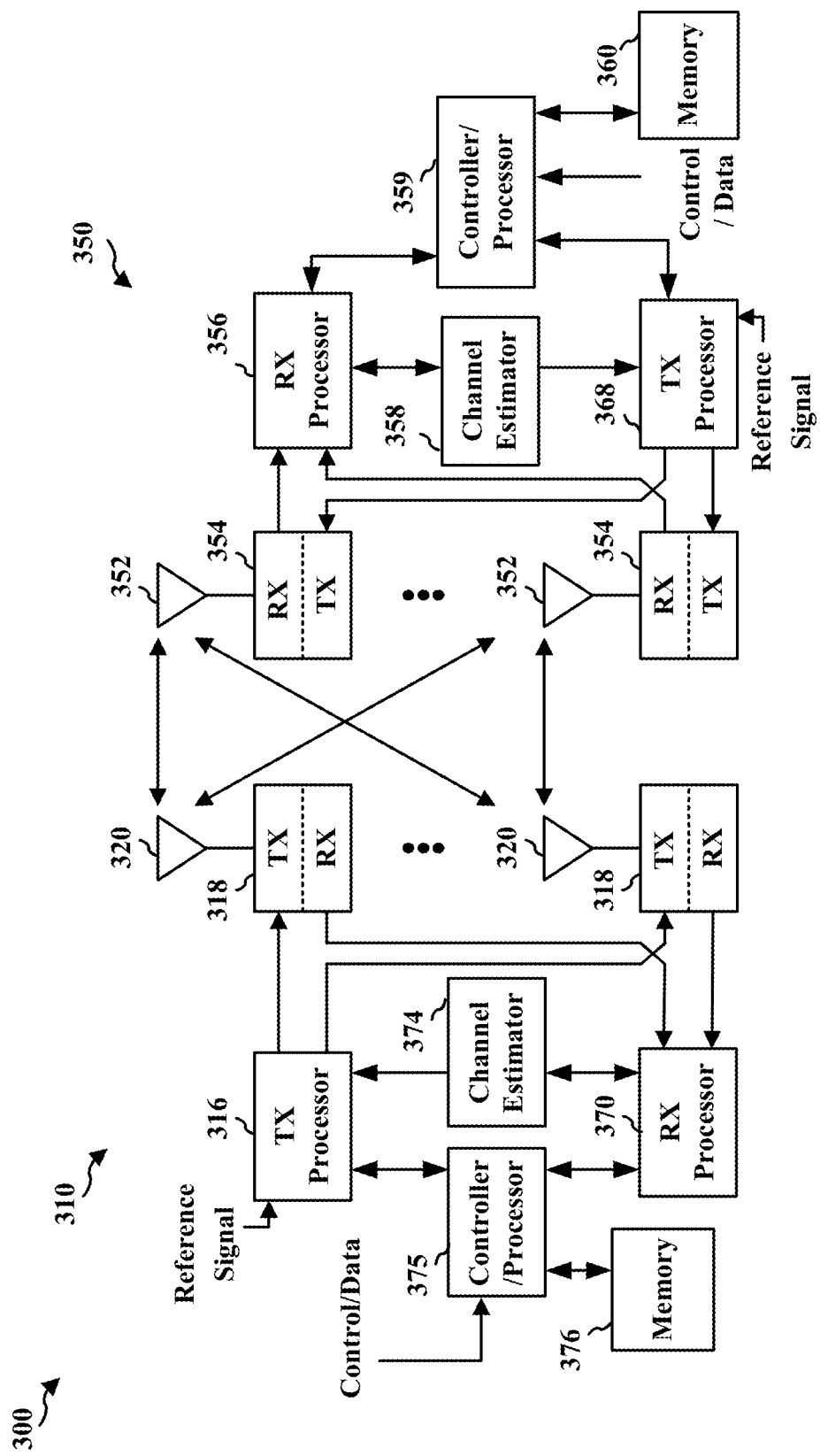
FIG. 3 is a diagram illustrating an example of a base station and user equipment (UE) in an access network.

FIG. 3 is a block diagram 300 of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
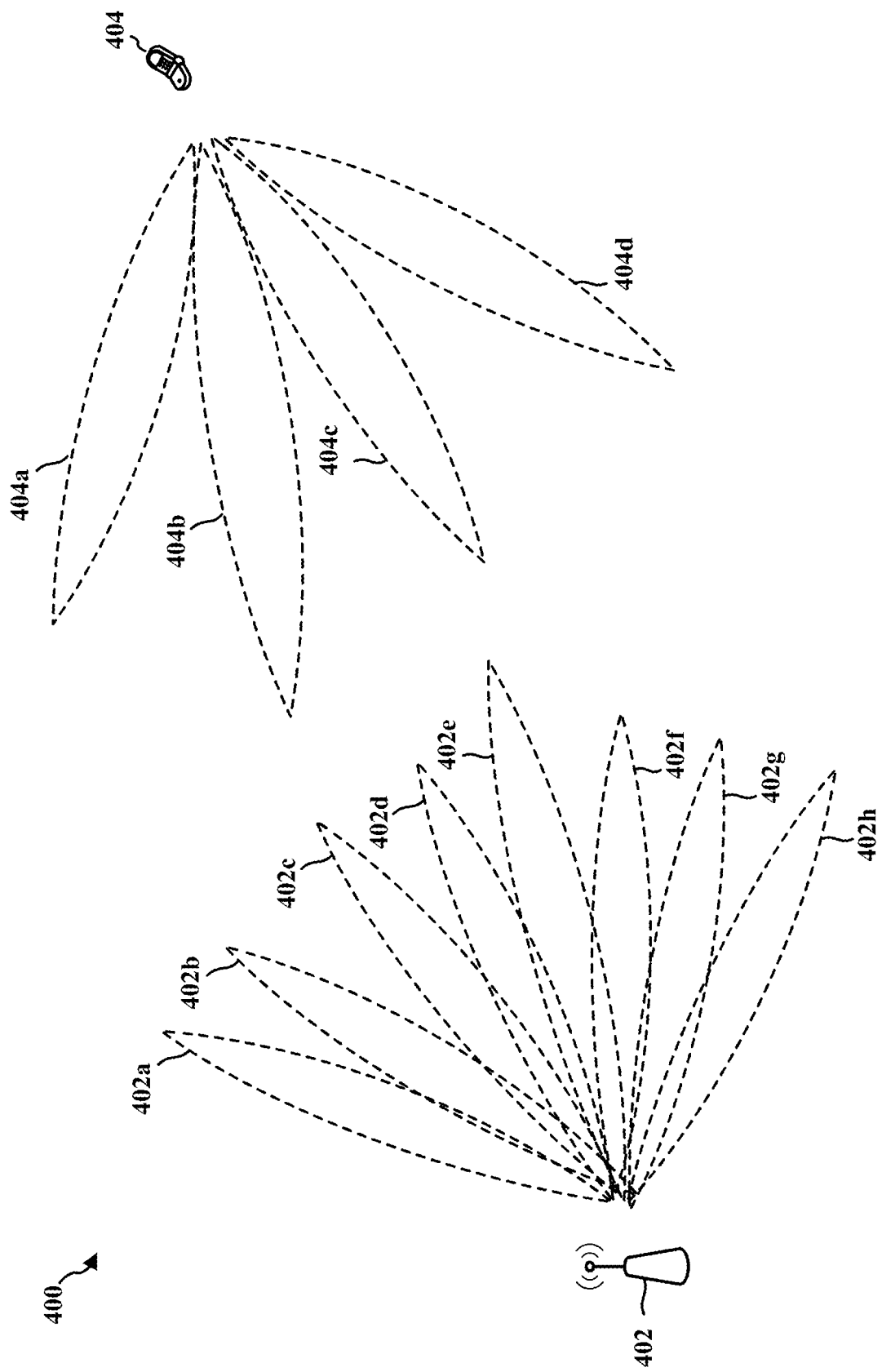
FIG. 4 is a diagram illustrating a base station in communication with a UE.

FIG. 4 is a diagram 400 illustrating a base station 402 (e.g., 180) in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Beamforming can be critical for optimal performance of mmW systems. As described in connection with FIG. 4, a base station and UE may use directional beams to establish initial mmW link as well as for steady-state/peak data rate transmissions. The base station, e.g., gNB 180, of FIG. 4 may use large antenna arrays. Example sizes of antenna arrays include 16×4, 32×4, 32×8, 64×4, 64×8, 128×16, etc. These large arrays may be assembled using smaller antenna modules (e.g., antenna modules having a size such as 4×4, 2×4, 2×2, etc.). A modular construction may be easier and more cost effective.

Ideally, all antennas of the large array should function correctly, enabling communication up to full/peak PA control. However, in practice, certain antennas in the antenna array may fail. The antenna elements may fail for any number of reasons. For example, VGAs of certain antennas may fail, RFIC may not be functioning at a certain point in time, components may age and fail with time, etc. Due to the modular construction of antenna arrays, e.g., in mmW systems, any of the base station's antenna modules or antenna elements within antenna modules may fail. It can be disruptive to ongoing communication to wait for faulty antennas/modules to be fixed. Similarly, a CPE may comprise an antenna array with multiple antenna elements and/or with multiple antenna modules. Failure of antenna elements or antenna modules at a CPE lead to similar challenges in transmitting and receiving communication at the CPE.

Aspects presented herein enable a base station or a CPE to continue to function until the hardware problems can be resolved. The present application provides detection and mitigation strategies that can be applied for antenna failures within an antenna array. While these examples are described in connection with a base station, e.g., gNB, similar problems may also occur at a UE side, in CPE, or in backhaul examples. The aspects of antenna failure detection and mitigation can be applied to these situations, as well. The aspects presented herein for detecting and mitigating antenna failure may be applied to arrays of antennas, irrespective of operating frequency/band, e.g., the aspects may be applied to mmW, sub-6, LTE, 5G-NR, WiFi, etc.

A base station may become aware of specific antenna failures by performing a built-in self-test (BIST). However, a BIST would be expensive to implement, especially if an on-chip unit is used. A BIST may also present implementation challenges, as it may require constant/periodic interventions.

In another option, the base station or CPE may use assistance from a receiver to detect antenna failure. For example, a base station may use assistance from UEs in the cell, a CPE, or from another base station to detect a failure at the base station. Similarly, a CPE may use assistance information from a base station to detect a failure at the CPE.

Once a failure is detected, a base station or CPE may perform any of a number of different mitigation operations. For example, the base station or CPE may recalibrate the large antenna array.

A transmit antenna gain has two components: PA power and co-phasing/array gain. If some of the antennas in an antenna array fail, PA power is lost from these antennas. However, a codebook design may provide enough robustness to ensure a level of co-phasing/array gain that enables continued wireless communication even when some of the antennas fail, are removed, are not transmitting, etc. Thus, different codebook designs may be used to mitigate antenna failure. A base station may generate electric (E) field data and redesign beam codebooks once it has knowledge of specific antenna failures, e.g., nulling out beam weights of certain antennas in beam design. However, this approach, in which the base station redesigns codebooks, may be time consuming and may require intense manual input. In another example, the base station may switch between predefined codebooks when antenna failure is detected.

If a number of antennas that have failed is small enough, the base station or CPE can continue to function with only a small deterioration in performance. Thus, the base station or CPE can continue to function with the standard codebook.

If the fraction of antennas or percentage of antennas that have failed exceeds a certain critical threshold, wireless communication may not be maintained, and human intervention may be needed to manually improve the array gain and restore the base station's performance.

Thus, it may be important for the base station or CPE to be able to adapt its operation and strategy based on an amount of antennas for which failure is detected (e.g., a fraction of failed antennas within the array or a number of failed antennas in the array). In order to take action, the base station or CPE needs to determine the amount of antennas that are faulty or that are not operating properly.

The base station or CPE may use signal measurement information from a receiver to detect a failure of antenna elements in an antenna array. For example, the base station or CPE may transmit a pilot signal using sets of antenna elements in the antenna array and may use signal measurement information (e.g., RSRP measurements) from a receiver based on the pilot signals.

Figure 5:
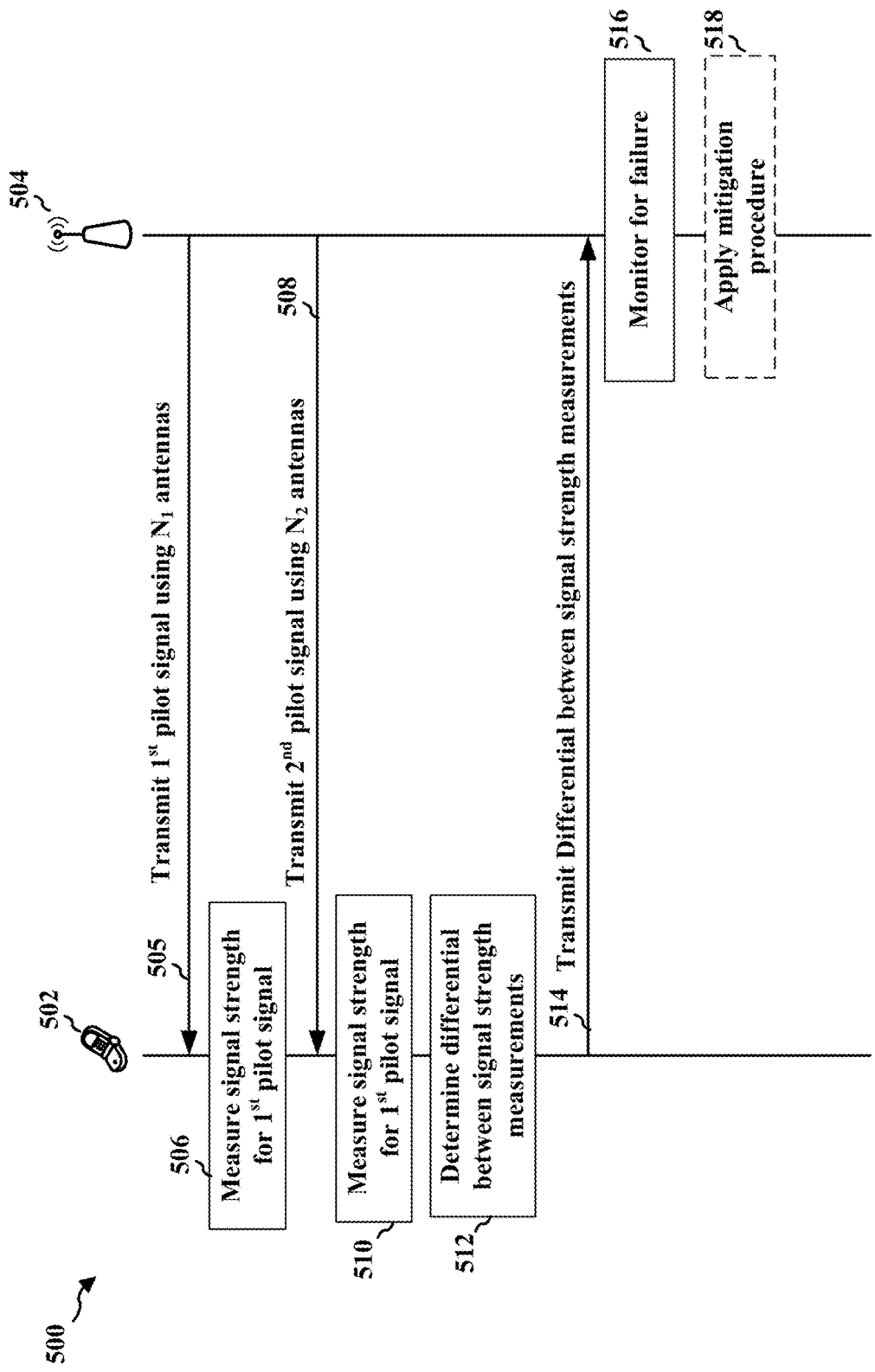
FIG. 5 illustrates a communication flow between a UE and a base station.

FIG. 5 illustrates an example communication flow 500 between a base station 504 (e.g., base station 102, 180, 310, 402, the apparatus 1102, 1102') and a user equipment 502 (e.g., 104, 350, 404, 1150) that enables the base station to detect and mitigate antenna element failure. The base station 504 may be a mmW gNB communicating with a UE. Although illustrated using a base station 504 and UE 502, the aspects of antenna failure detection and mitigation in FIG. 5 can be applied to other examples involving CPE and a base station, a base station receiving measurement information from another base station, etc. In an example between a base station and CPE, the aspects performed by base station 504 may be performed either by the CPE or by the base station. The aspects may be applied irrespective of operating frequency/band, e.g., mmW, sub-6, LTE, 5G-NR, WiFi, etc., to enable a transmitter having an antenna array to detect antenna element failure using measurement information from a receiver.

Figure 6:
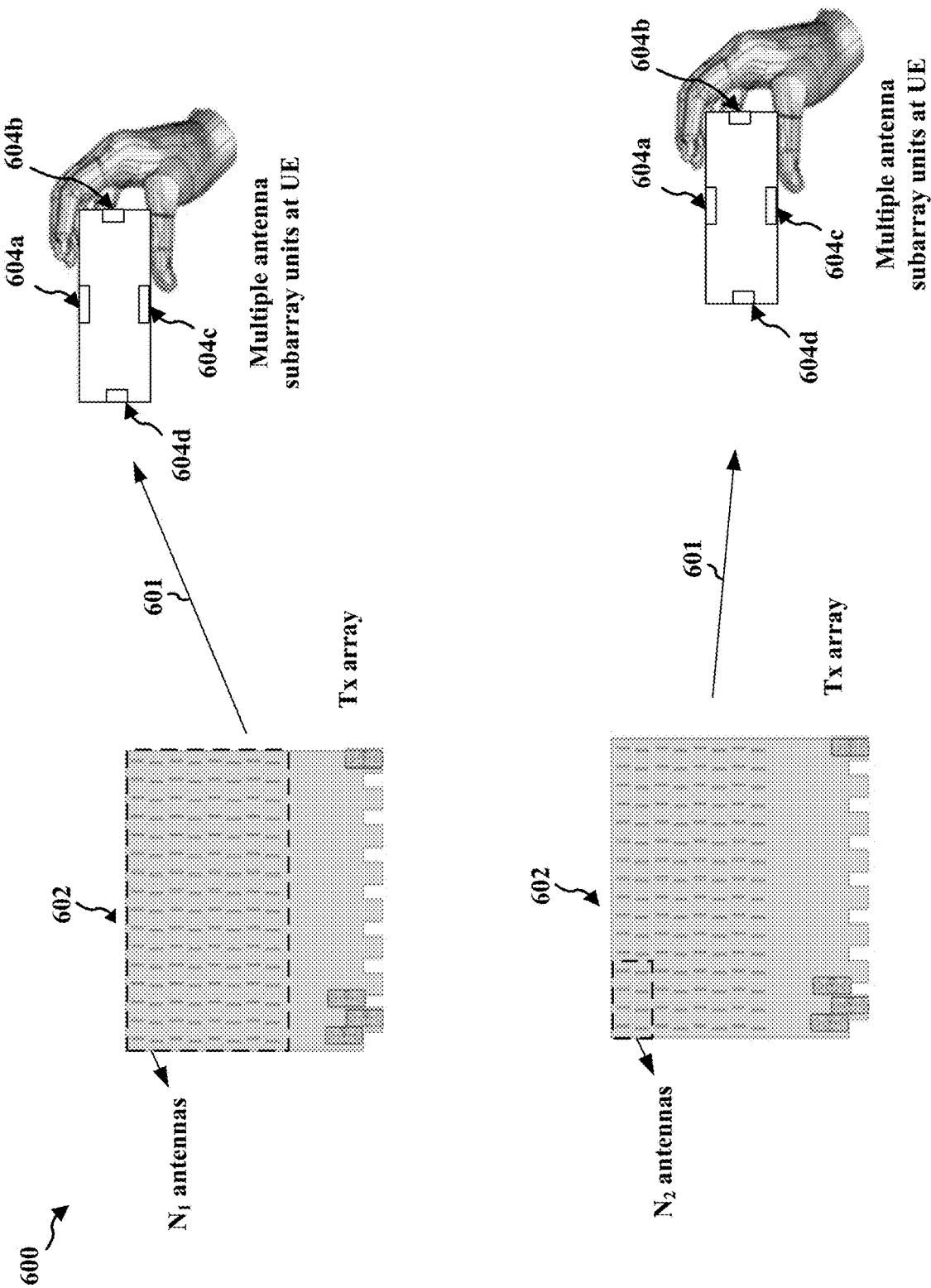
FIG. 6 illustrates example sets of antenna elements in an antenna array for transmitting pilot signals to detect antenna element failure.

At 505, the base station transmits a first pilot signal using a first set $N_1$ of antennas, where N represents a set of antenna elements within the antenna array. In one example, the pilot signal may be a pilot symbol. FIG. 6 illustrates an example 600 showing an antenna array 602 of 16×8 antennas. The base station may use antennas with a pilot symbol 601 over an a priori known direction, e.g., a boresight, dominant reflector learned in initial acquisition (initAcq), as described in connection with FIG. 4.

At 506, the UE measures the signal strength for the pilot signal at 505. For example, the UE may measure an RSRP for the pilot signal (e.g., $RSRP_1$). FIG. 6 illustrates that the UE may comprise multiple antenna subarray units 604a, 604b, 604c, 604d. The subarray units may also be referred to as antenna modules. The UE may use a corresponding reception beam associated with the transmit beam used by the base station to transmit the pilot signal, as described in connection with FIG. 4.

At 508, the base station transmits a second pilot signal using a second set ($N_2$) of antennas. The second pilot signal may be transmitted along the same beam direction as the pilot signal at 505. FIG. 6 illustrates a second set $N_2$ of 4×2 antennas comprised in the 16×8 array. As illustrated in the example of FIG. 6, the second set of antennas $N_2$ may be a subset of the first set $N_1$. The second set may comprise a single antenna within the first set. Using a single antenna for $N_2$ may work well when a link budget with the single antenna is good enough for the UE to decode the second pilot signal. Using a single antenna will enable the base station to identify which particular antennas have failed.

In other examples, $N_2$ may comprise a random subset of multiple antennas comprised in $N_1$. This may ensure the needed link budget at the UE. While the use of multiple antennas for $N_2$ may not enable the base station to identify the particular antennas that have failed, it will enable the base station to determine a relative fraction of useful antennas from the two sets.

$N_1$ in the example of FIG. 6, comprises the entire 16×8 array 602 of antennas. This is merely one example. The first set of antennas may comprise a subset of the antenna array, and the second set may comprise a subset of the first set. The base station may periodically transmit the pilot signal over different subsets of $N_2$ antennas comprised in the first set $N_1$. If $N_1$ is a random subset of the antenna array, the base station may also periodically repeat the pilot signal transmissions over different sets $N_1$.

At 510, the UE measures a second signal strength (e.g., $RSRP_2$) of the second pilot signal. The UE may use the same reception beam as in 506 that was used to measure $RSRP_1$.

At 512, the UE may determine a differential between the signal strength measurements for the first pilot signal and the second pilot signal (e.g., a differential between $RSRP_1$ and $RSRP_2$). At 514 the UE may transmit the differential between the signal strength measurements to the base station 504. In other examples, the UE may report the signal strength measurement individually for each of the pilot signals, and the base station may determine the differential between the signal strength measurements for different pilot signals.

At 506, the base station may use the received measurement information to detect antenna failure at the antenna array.

For example, in the ideal case where none of the antennas have failed, equation 1 would apply. However, in actual practice, equation 2 may indicate that $(1-\alpha)$ of the $N_1$ antennas have failed at the base station 504.

$$10\ \log_{10}\left(\frac{RSRP_1}{RSRP_2}\right) = 10\ \log_{10}\left(\frac{N_1}{N_2}\right) \quad \text{Equation 1}$$

$$10\ \log_{10}\left(\frac{RSRP_1}{RSRP_2}\right) = 10\ \log_{10}\left(\frac{\alpha N_1}{N_2}\right) \quad \text{Equation 2}$$

Thus, the differential between $RSRP_1$ and $RSRP_2$ (e.g., $RSRP_1/RSRP_2$), whether calculated by the UE or by the base station, enables the base station to determine a fraction (e.g., $1-\alpha$) of antennas within the first set that have failed. The base station may periodically repeat transmission of the pilot signals over different sets of $N_1$ and/or $N_2$, and may check the UE signal strength measurement report to see whether the UE reports a similar signal strength differential. The differential itself, as well as variations across different differentials may indicate antenna failure.

When the base station detects, at 516, that a failure has occurred, and/or depending on the level of failure detected, the base station may apply a mitigation procedure at 518. For example, the base station may switch to a different codebook, increase VGA, increase DL transmission power, and/or indicate to the UE to increase UL transmission power, etc. A CPE may perform similar mitigation procedures.

Figure 7:
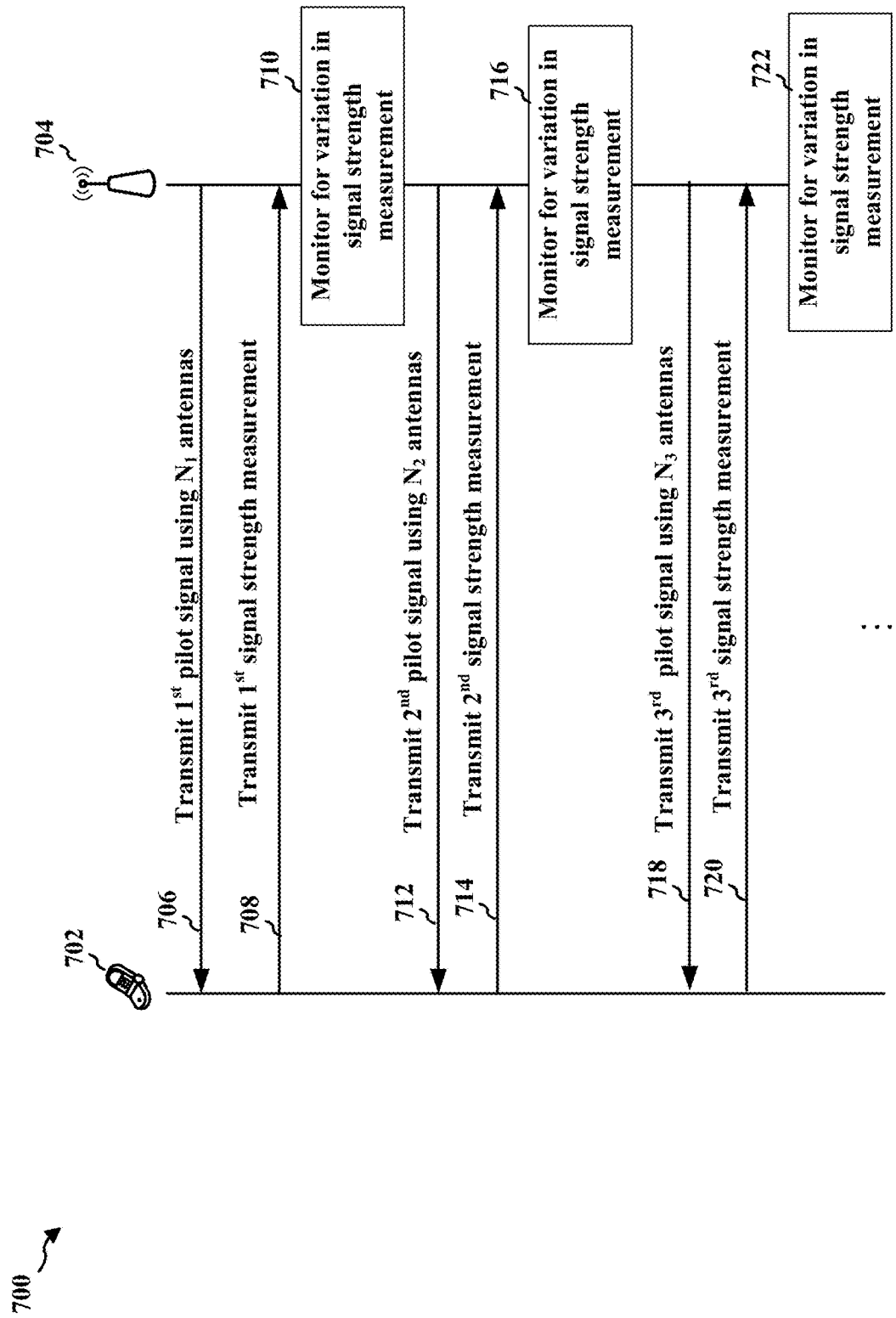
FIG. 7 illustrates a communication flow between a UE and a base station.

FIG. 7 illustrates a second example communication flow 700 between a base station 704 (e.g., base station 102, 180, 310, 402, the apparatus 1102, 1102') and a user equipment 702 (e.g., 104, 350, 404, 1150) that enables the base station to detect and mitigate antenna element failure. As described in connection with FIG. 5, while the example of FIG. 7 uses communication between a base station and a UE to illustrate the aspects of the present application, the aspects can also be applied, e.g., in communication between two base stations or in communication between a base station and a CPE. In the example in which the communication is between a CPE and a base station, the aspects performed by base station 704 may be performed by the base station or by the CPE. In the example of FIG. 7, the base station may transmit pilot signals using different random subsets of antennas and may monitor for variations across signal strength measurements from the UE in order to detect antenna failure.

Figure 8:
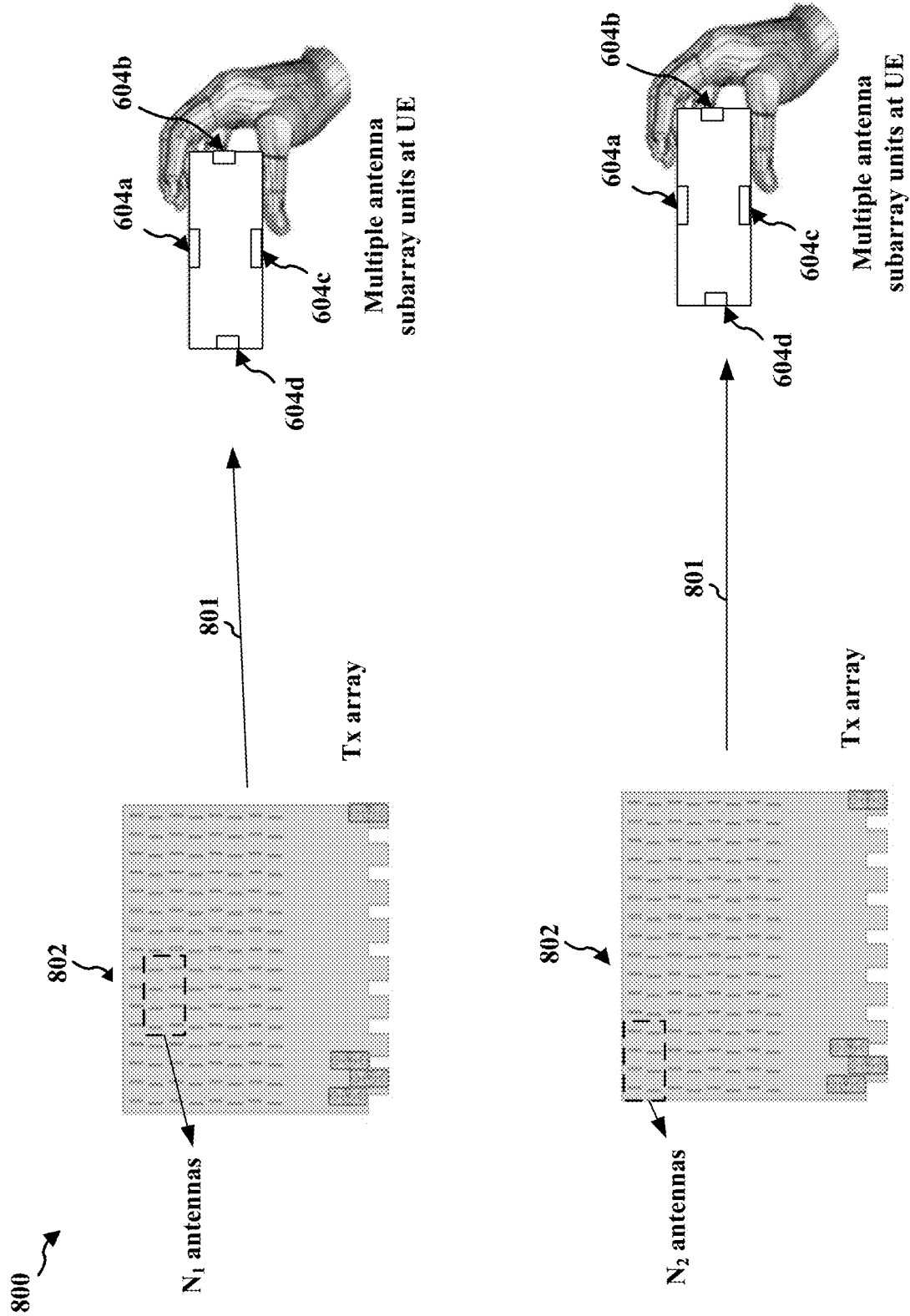
FIG. 8 example sets of antenna elements in an antenna array for transmitting pilot signals to detect antenna element failure.

At 706, the base station may transmit a first pilot signal in a beam direction using a first set $N_1$ of antennas. FIG. 8 illustrates an example 800 showing a set $N_1$ of 4×2 antennas within the 16×8 array 802 to transmit a pilot signal 801 to a UE having antenna subarray units 604a-d.

The UE may perform a signal strength measurement of the first pilot signal, e.g., using a reception beam that corresponds to the transmission beam used by the base station. The UE may transmit at 708, a first signal strength measurement (e.g., $RSRP_2$) to the base station.

Each time the base station receives a signal strength measurement, the base station may monitor for variations in the signal strength measurement that may indicate an antenna failure within the set of antennas used to transmit the pilot signal, e.g., at 710, 716, 722.

At 712, the base station may transmit a second pilot signal using a second set $N_2$ of antennas. As illustrated in FIG. 8, the second set of antennas $N_2$ may be the same size as $N_1$ and may comprise a different subset of antennas than $N_1$. The example size 4×2 set illustrated in FIG. 8 is merely one example. Any size of antenna sets may be used, as long as the random sets comprise a same size so that the base station may look for variations in the signal strength measurement reports at 710, 714, 722, etc. In one example, the set may comprise a single antenna, which may enable the base station to check the gain with a single antenna scan over different symbol periods.

The base station may continue to periodically transmit pilot signals, e.g., at 718, using a same sized set of antennas and receive a signal strength measurement, e.g., at 720, from the UE.

While the examples in FIGS. 5-8 are described in connection with a base station transmitting a signal and using signal measurement information from a UE to detect antenna failure, such aspects may also be used by a UE or by a CPE to detect and mitigate antenna failure.

In an example in which the failure detection is performed by a CPE, the base station may assist the CPE in the failure detection, e.g. in the determination of a. For example, the base station may provide the CPE with opportunities to transmit the pilot signals so that the base station can provide the signal measurements back to the CPE that are used to detect the antenna element failure. In another example, the base station may provide the CPE with an indication of a length of time for the pilot signal transmissions. In yet another example, the base station may indicate a subset of antennas that the CPE should use in the failure detection process, e.g., a subset of antenna elements that the CPE should use to transmit at least one pilot signal to check for failures within the subset of antenna elements. The CPE may use such information received from the base station to perform the failure detection aspects described in connection with FIGS. 5-8.

Figure 9:
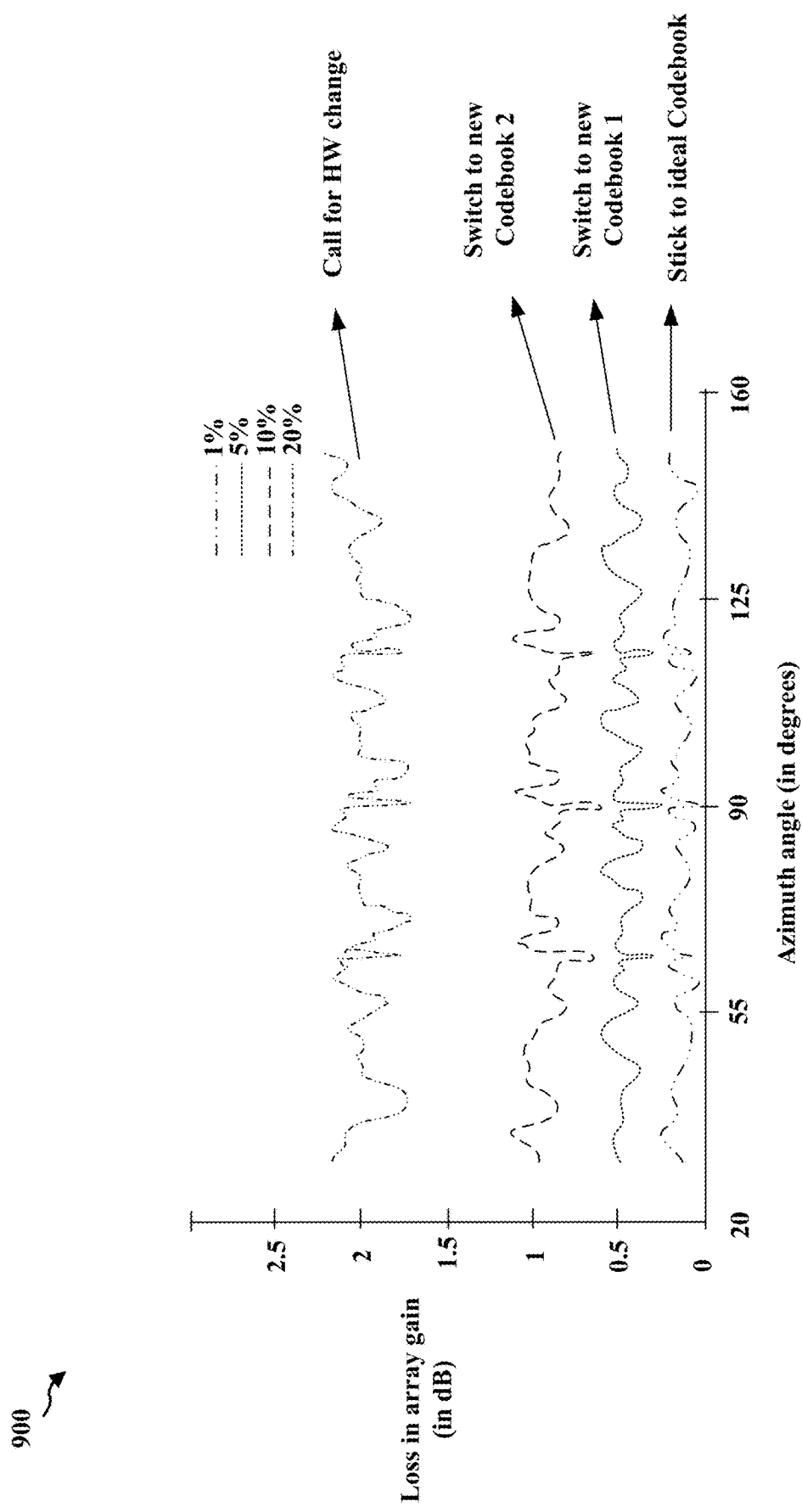
FIG. 9 illustrates example levels for applying different mitigation operations.

FIG. 9 illustrates a graph 900 showing example levels of antenna failure that may trigger different mitigation operations. In the example in FIG. 9, a loss in array gain is illustrated for an example gNB having a 32×4 array of antenna elements and using an ideal 4 wide beam codebook covering a 120 degree area for SS block transmissions. At each of the four levels of failed antennas, a different mitigation technique may be applied. For example, when the detected fraction of failed antennas is below 5%, the base station may continue to use the ideal codebook. The base station may experience little loss when at least 95% of the antennas are functioning properly.

When the fraction exceeds 5% (e.g., 10%≥1−α>5%), a first codebook may be applied to mitigate the failure. When the fraction of failed antenna elements exceeds 10% (e.g., 20%≥1−α>10%), a second codebook may be applied. When the fraction of failed antenna elements exceeds 20% (e.g., 1−α>20%), an alert may be provided to indicate a need for a hardware change. This may signal a need for human intervention, e.g., to service or replace hardware. Additionally, the alert may indicate a need to adjust manufacturing processes to satisfy certain quality control to ensure a failure rate below 20%. There may be fewer or more thresholds than the four examples illustrated in FIG. 9. Furthermore, the thresholds of 5%, 10%, and 20% are merely examples. The level of the thresholds that trigger a mitigation operation may be different than these examples.

As well, depending on the level of antenna failure, e.g., a fraction of failed antennas and/or a number of failed antennas, there may be a shortfall in the link budget between the base station and the UE. In order to mitigate this shortfall, the base station may increase its VGA level, and or its DL transmission power level to compensate for the loss. The base station may transmit an indication to the UE to increase its power level, e.g., in the power control loop. Thus, the UE may increase its transmission power for UL transmissions to the base station to compensate for the loss due to antenna failure at the base station.

Figure 10:
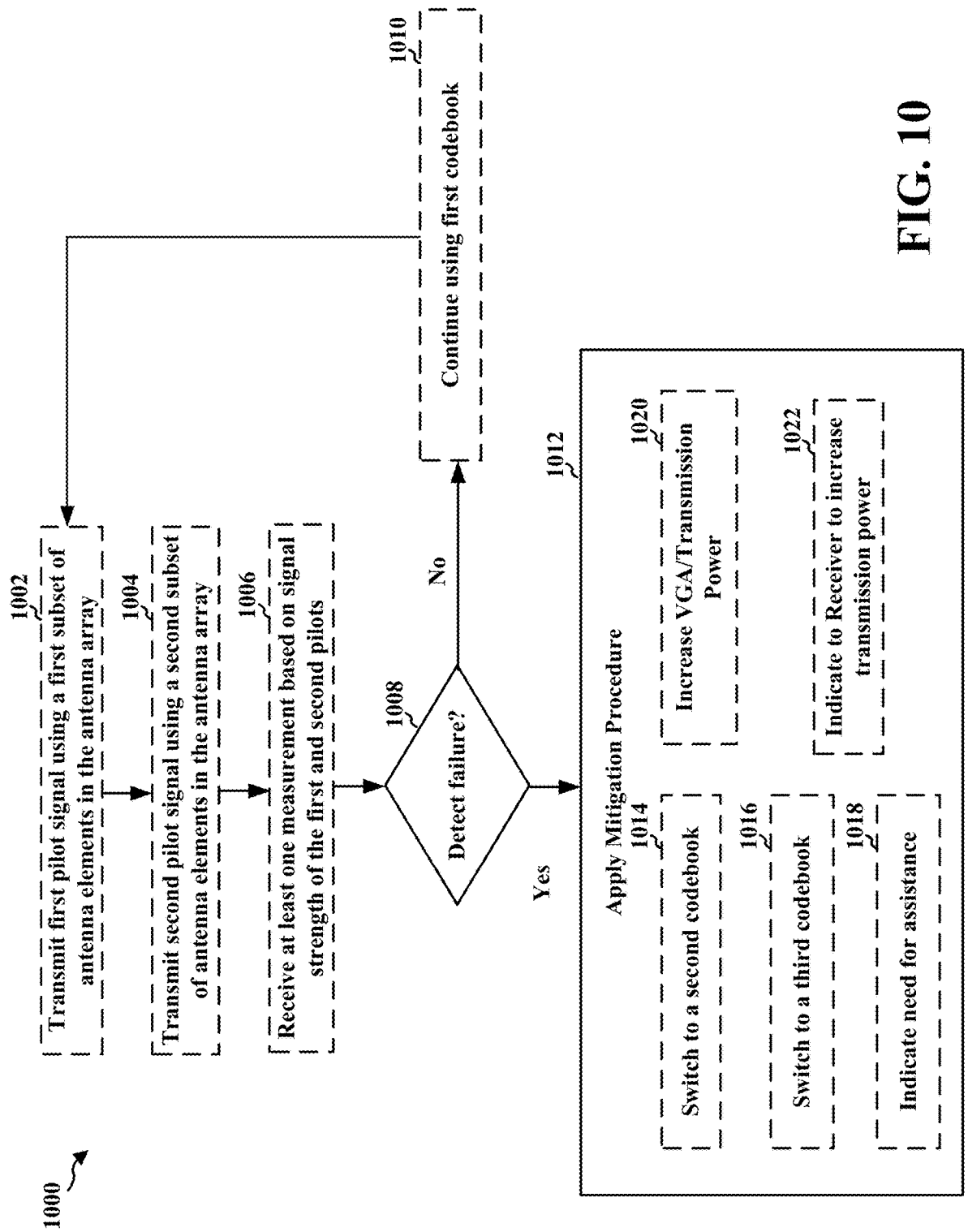
FIG. 10 is a flowchart of a method of wireless communication.

FIG. 10 is a flowchart 1000 of a method of wireless communication. In one example, the method may be performed by a base station (e.g., the base station 102, 180, 310, 504, 704). In another example, the method may be performed by a CPE. Optional aspects are illustrated using a dashed line. Aspects of the method 1000 enable the apparatus to detect antenna element failures and to perform mitigating procedures to address detected failure. This may enable the base station or CPE to continue to function, e.g., until a hardware problem can be resolved. The method for antenna failure may be applied for various frequencies, e.g., mmW, sub-6, LTE, 5G-NR, WiFi, etc. Aspects may be applied to large arrays of antennas, irrespective of operating frequency/band. While the example is described in connection with a base station and UE, aspects may be applied for antenna array error detection and mitigation for backhaul between a first base station and a second base station, between a CPE and a base station, etc. The method may be performed, e.g., by apparatus 1102/1102'. At 1008, the apparatus detects a failure of at least one antenna element associated with an antenna module in an antenna array, the antenna array comprising a plurality of antenna modules. The failure may be detected for a failure of antenna elements at the base station and/or for the failure of antenna elements at a CPE, for example.

In order to detect a failure in the antenna array may be detected, the apparatus may transmit a first pilot signal using a first set of antenna elements, in the antenna array at 1002. The apparatus may transmit a second pilot signal using a second set of antenna elements, in the antenna array at 1004. The apparatus may then receive at least one signal strength measurement based on the first pilot signal and the second pilot signal at 1006, wherein the failure is detected at 1008 based on the received signal strength measurement.

In an example in which the method is performed by a base station, the signal strength measurement(s) may be received from a user equipment. In another example in which the method is performed by a base station, the signal strength measurement may be received from a second base station. In yet another example, in which the method is performed by a base station, the signal strength measurement(s) may be received from a CPE. In an example in which the method is performed by a CPE, the signal strength measurement(s) may be received from a base station, e.g., a gNB.

The second set of antenna elements may comprise a subset (e.g., a single antenna element or multiple antenna elements) of the first set of antenna elements, as described in connection with FIGS. 5 and 6. The at least one received signal strength measurement may comprise a differential between a first signal strength measurement for the first set of antenna elements and a second signal strength measurement for the second set of antenna elements.

In another example, the first set of antenna elements may comprise a same number of antenna elements as the second set of antenna elements, and the first set of antenna elements may comprise different antenna elements than the second set of antenna elements, as described in connection with FIGS. 7 and 8. The at least one received signal strength measurement may include a first signal strength measurement based on the first pilot signal and a second signal strength measurement based on the second pilot signal, and the failure may be detected based on signal strength variations across a plurality of pilot signals.

At 1012, the apparatus applies a mitigation procedure in response to detecting the failure. As illustrated at 1014, applying the mitigation procedure at 1012 may include switching from a first codebook to a second codebook. The second codebook may be selected based at least on an amount of antenna elements for which the failure is detected. In one example, the amount may comprise, e.g., a fraction of antenna elements for which failure is detected. In another example, the amount may comprise a number of antenna elements for which failure is detected.

In one example, detecting the failure at 1008 may include detecting an amount of failing antenna elements in the antenna array (e.g., a fraction of antenna elements that have failed). In this example, the mitigation procedure may comprise continuing to use a first codebook at 1010 when the amount is within a first range (e.g., when the fraction of failed antennas is below a first threshold). The first codebook may be the ideal codebook. The base station may switch to a second codebook at 1014 when the amount is within a second range, e.g., when the fraction of failed antennas is above the first threshold. The second range may also involve the fraction of failed antennas being below a second threshold. The second codebook may be a modified codebook that mitigates the effect of the failed antenna elements.

Additional codebooks may also be used, e.g., when the amount of failed antenna elements increases beyond the second range, e.g., above the second threshold. For example, the base station may switch to a third codebook at 1016 when the amount is within a third range (e.g., when the fraction of failed antennas is above the second threshold and below a third threshold). The second codebook may be another modified codebook that mitigates the effect of the increased number of failed antenna elements. While FIG. 10 only illustrates an example with three codebooks, the use of three codebooks is merely one example. Other numbers of codebooks may be provided that address different levels of failed antenna elements within an antenna array.

As illustrated at 1018, the apparatus may indicate a need for assistance when the amount is within a fourth range, e.g., when the number of failed antennas is above a fourth threshold. This can alert someone that human intervention/repair is needed for the base station's antenna array.

In another example, applying the mitigation procedure at 1012 may include increasing at least one of a VGA or a transmission power level for downlink transmissions at the base station at 1020.

In another example, applying the mitigation procedure at 1012 may include indicating to a user equipment to increase a transmission power level for uplink transmissions at 1022.

Any combination of the mitigation procedures may be applied to address the detected failure of antenna elements.

Figure 11:
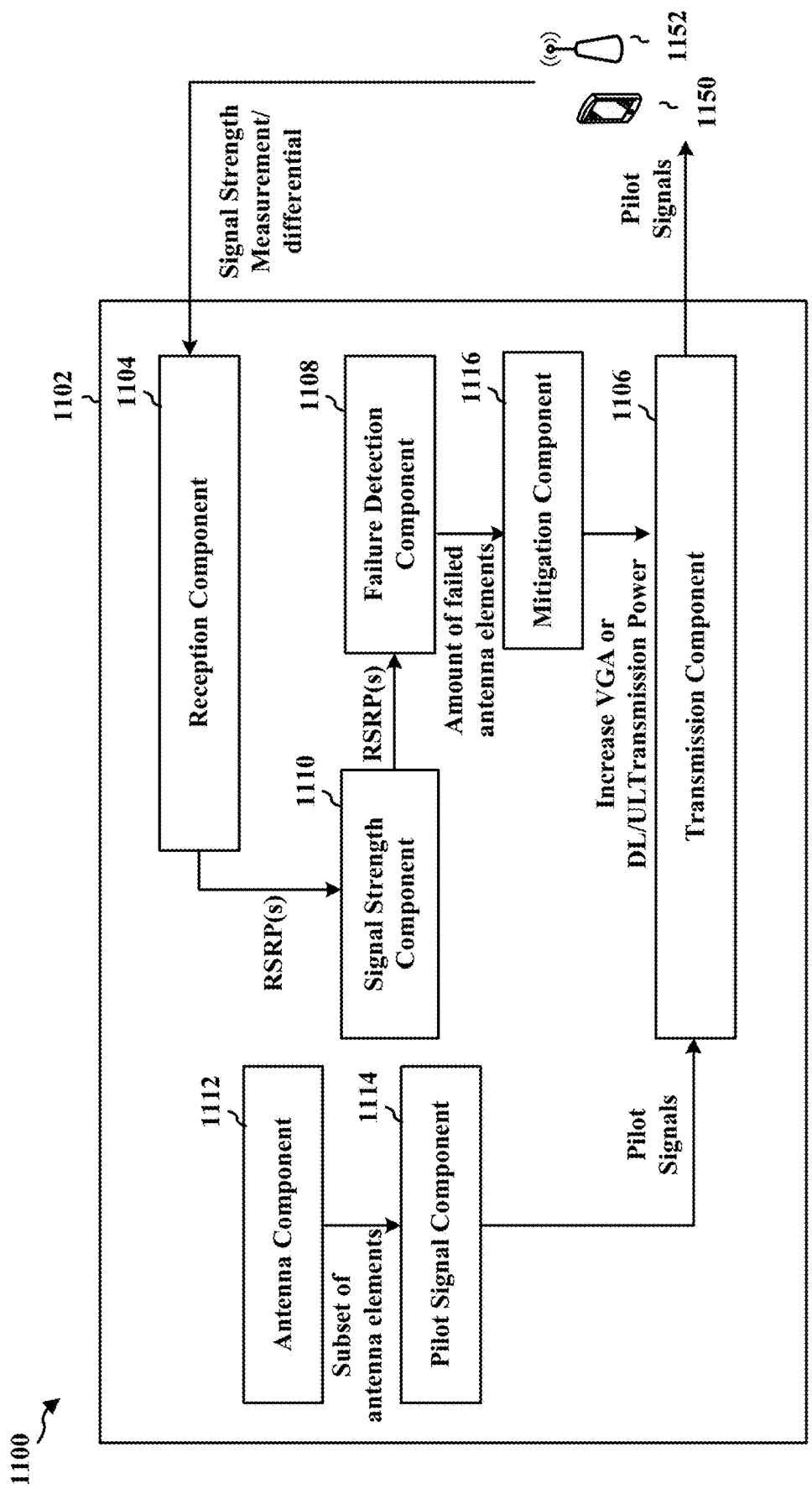
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a base station (e.g., the base station 102, 180, 310, 504, 704). In another example, the apparatus may be a CPE. The apparatus includes a reception component 1104 that receives uplink communication from a user equipment 1150 or communication from base station 1152. Transmission component 1106 may be configured to transmit downlink communication, e.g., to UE 1150, if the apparatus 1102 is a base station. In another example in which the apparatus 1102 is a CPE, the transmission component 1106 may be configured to transmit uplink communication to base station 1152. The apparatus may include a failure detection component 1108 configured to detect a failure of at least one antenna element associated with an antenna module in an antenna array, e.g., at the base station or CPE. The antenna array may comprise a plurality of antenna modules. The apparatus may include a mitigation component 1116 configured to apply a mitigation procedure in response to detecting the failure. The mitigation component may switch codebooks, increase a VGA, increase a DL transmission power, indicate to a UE to increase an UL transmission power, and any combination thereof. The mitigation procedure that is applied may depend on the amount of antenna elements for which failure is detected, e.g., a fraction of antenna elements for which failure is detected.

The apparatus may include a pilot signal component 1114 may be configured to transmit a first pilot signal using a first set of antenna elements in the antenna array and transmit a second pilot signal using a second set of antenna elements in the antenna array. The sets of antenna elements may be selected by an antenna component 1112, e.g., as described in the examples of FIGS. 5-8. The pilot signals may be transmitted via the transmission component 1106. A signal strength component 1110 may be configured to receive at least one signal strength measurement based on the first pilot signal and the second pilot signal, wherein the failure is detected at the failure detection component 1108 based on the received signal strength measurement.

The apparatus may include additional components that perform each of the blocks of the algorithm in the aforementioned flowcharts of FIGS. 5, 7, and 10. As such, each block in the aforementioned flowcharts of FIGS. 5, 7, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
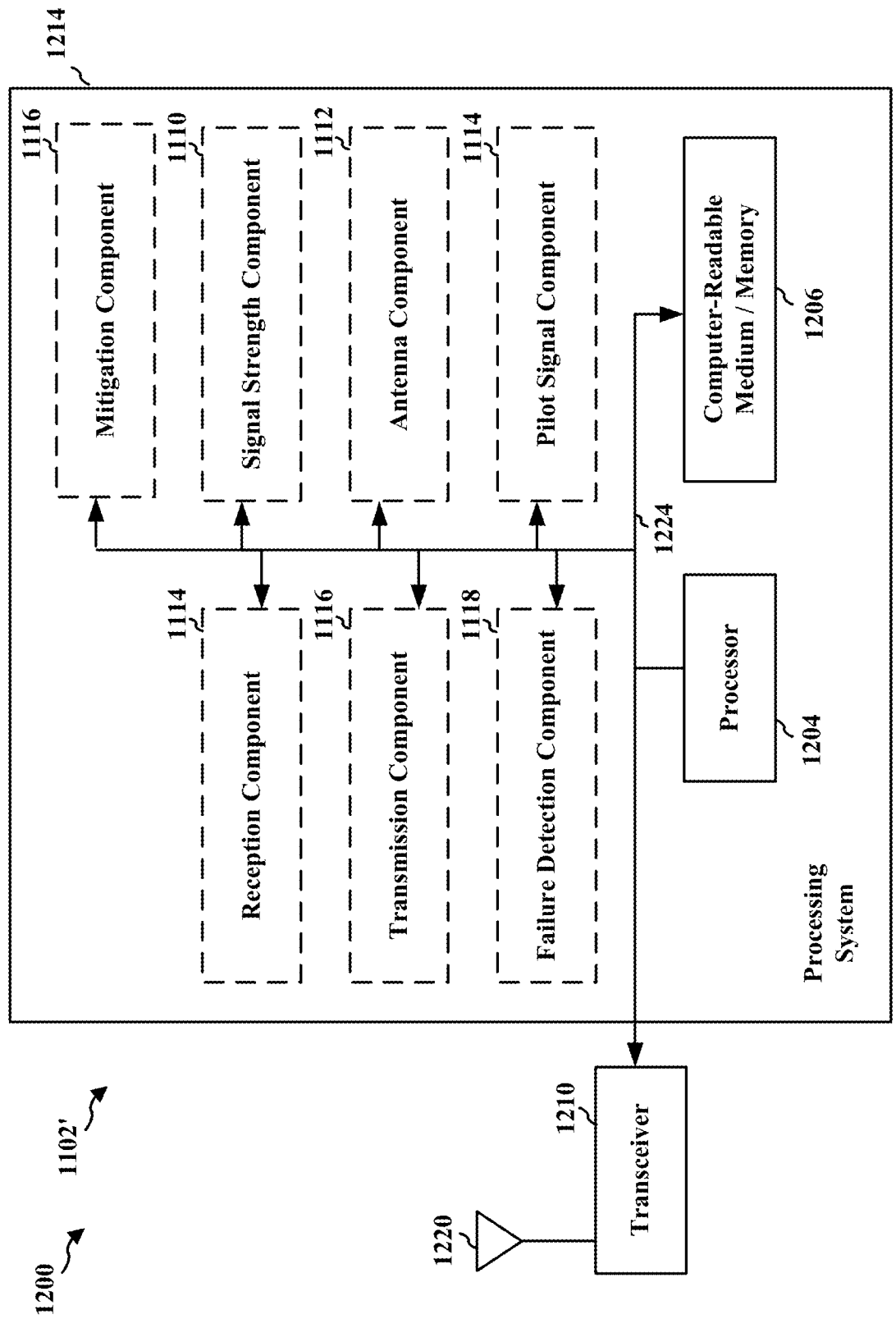
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375.

In one configuration, the apparatus 1102/1102' for wireless communication includes means for detecting a failure of at least one antenna element associated with an antenna module in an antenna array, the antenna array comprising a plurality of antenna modules, applying a mitigation procedure in response to detecting the failure, means for switching from a first codebook to a second codebook, means for increasing at least one of a variable gain amplifier (VGA) or a transmission power level for downlink transmissions at the base station, means for indicating to a user equipment to increase a transmission power level for uplink transmissions, means for transmitting a first pilot signal using a first set of antenna elements in the antenna array and transmitting a second pilot signal using a second set of antenna elements in the antenna array, and means for receiving at least one signal strength measurement based on the first pilot signal and the second pilot signal. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first device, comprising:

transmitting a first pilot signal in a beam direction using a first set of multiple antenna elements in an antenna array comprising a plurality of antenna modules;

transmitting a second pilot signal in the beam direction using a second set of antenna elements in the antenna array, the second set of antenna elements being different than the first set of multiple antenna elements;

receiving at least one signal strength measurement from a second, external device that wirelessly received the first pilot signal and the second pilot signal, the at least one signal strength measurement being based on the first pilot signal and the second pilot signal;

detecting a failure of at least one antenna element associated with an antenna module in the antenna array based on the at least one signal strength measurement received from the second, external device; and applying a mitigation procedure in response to detecting the failure of the at least one antenna element;

wherein detecting the failure of the at least one antenna element includes detecting an amount of failing antenna elements in the antenna array, and wherein applying the mitigation procedure comprises one or more of:

continuing to use a first codebook when the amount of failing antenna elements is within a first range; and switching to a second codebook when the amount of failing antenna elements is within a second range.

2. The method of claim 1, wherein the method is performed by a base station.

3. The method of claim 1, wherein the method is performed by a customer premises equipment.

4. The method of claim 1, wherein applying the mitigation procedure further comprises one or more of:

switching to a third codebook when the amount of failing antenna elements is within a third range; and indicating a need for assistance when the amount of failing antenna elements is within a fourth range.

5. The method of claim 1, wherein applying the mitigation procedure comprises:

increasing at least one of a variable gain amplifier (VGA) or a transmission power level for downlink transmissions.

6. The method of claim 1, wherein applying the mitigation procedure comprises:

indicating to a user equipment to increase a transmission power level for uplink transmissions.

7. The method of claim 1, wherein the second set of antenna elements comprises a subset of the first set of multiple antenna elements.

8. The method of claim 1, wherein the second set of antenna elements comprises a single antenna element within the first set of multiple antenna elements.

9. The method of claim 1, wherein the at least one signal strength measurement from the second, external device comprises a differential between a first signal strength measurement at the second, external device for the first pilot signal using the first set of multiple antenna elements and a second signal strength measurement at the second, external device for the second pilot signal using the second set of antenna elements.

10. The method of claim 1, wherein the first set of multiple antenna elements comprises a same number of antenna elements as the second set of antenna elements, wherein the first set of multiple antenna elements comprises different antenna elements than the second set of antenna elements, wherein the at least one signal strength measurement includes a first signal strength measurement at the second, external device based on the first pilot signal and a second signal strength measurement at the second, external device based on the second pilot signal, and wherein the failure of the at least one antenna element is detected based on signal strength variations across a plurality of pilot signals.

11. The method of claim 1, wherein the second, external device comprises a user equipment, a customer premises equipment, or a base station.

12. An apparatus for wireless communication at a first device, comprising:

means for transmitting a first pilot signal in a beam direction using a first set of multiple antenna elements in an antenna array comprising a plurality of antenna modules and transmitting a second pilot signal in the beam direction using a second set of antenna elements in the antenna array, the second set of antenna elements being different than the first set of multiple antenna elements;

means for receiving at least one signal strength measurement from a second, external device that wirelessly received the first pilot signal and the second pilot signal, the at least one signal strength measurement being based on the first pilot signal and the second pilot signal;

means for detecting a failure of at least one antenna element associated with an antenna module in the antenna array based on the at least one signal strength measurement received from the second, external device; and means for applying a mitigation procedure in response to detecting the failure of the at least one antenna element;

wherein the means for detecting the failure of the at least one antenna element is configured to detect an amount of failing antenna elements in the antenna array, and wherein the means for applying the mitigation procedure is configured to perform one or more of:

continuing to use a first codebook when the amount of failing antenna elements is within a first range; and switching to a second codebook when the amount of failing antenna elements is within a second range.

13. The apparatus of claim 12, wherein the means for applying the mitigation procedure is configured to perform one or more of:

switching to a third codebook when the amount of failing antenna elements is within a third range; and indicating a need for assistance when the amount of failing antenna elements is within a fourth range.

14. The apparatus of claim 12, wherein the means for applying the mitigation procedure increases at least one of a variable gain amplifier (VGA) or a transmission power level for downlink transmissions.

15. The apparatus of claim 12, wherein the means for applying the mitigation procedure indicates to a user equipment to increase a transmission power level for uplink transmissions.

16. An apparatus for wireless communication, comprising:

a memory; and at least one processor coupled to the memory and configured to:

transmit a first pilot signal in a beam direction using a first set of multiple antenna elements in an antenna array comprising a plurality of antenna modules;

transmit a second pilot signal in the beam direction using a second set of antenna elements in the antenna array, the second set of antenna elements being different than the first set of multiple antenna elements;

receive at least one signal strength measurement from a second, external device that wirelessly received the first pilot signal and the second pilot signal, the at least one signal strength measurement being based on the first pilot signal and the second pilot signal;

detect a failure of at least one antenna element associated with an antenna module in the antenna array based on the at least one signal strength measurement received from the second, external device; and apply a mitigation procedure in response to detecting the failure of the at least one antenna element;

wherein detection of the failure of the at least one antenna element includes a detection of an amount of failing antenna elements in the antenna array, and wherein to apply the mitigation procedure the at least one processor is further configured to:

continue to use a first codebook when the amount of failing antenna elements is within a first range; and switch to a second codebook when the amount of failing antenna elements is within a second range.

17. The apparatus of claim 16, wherein to apply the mitigation procedure the at least one processor is further configured to:

switch to a third codebook when the amount of failing antenna elements is within a third range; or indicate a need for assistance when the amount of failing antenna elements is within a fourth range.

18. The apparatus of claim 16, wherein to apply the mitigation procedure, the at least one processor is further configured to:

increase at least one of a variable gain amplifier (VGA) or a transmission power level for downlink transmissions.

19. The apparatus of claim 16, wherein to apply the mitigation procedure, the at least one processor is further configured to:

indicate to a user equipment to increase a transmission power level for uplink transmissions.

20. A non-transitory computer-readable medium storing computer executable code for wireless communication, comprising code to:

transmit a first pilot signal in a beam direction using a first set of multiple antenna elements in an antenna array comprising a plurality of antenna modules;

transmit a second pilot signal in the beam direction using a second set of antenna elements in the antenna array, the second set of antenna elements being different than the first set of multiple antenna elements;

receive at least one signal strength measurement from a second, external device that wirelessly received the first pilot signal and the second pilot signal, the at least one signal strength measurement being based on the first pilot signal and the second pilot signal;

detect a failure of at least one antenna element associated with an antenna module in the antenna array based on the at least one signal strength measurement received from the second, external device; and apply a mitigation procedure in response to detecting the failure of the at least one antenna element;

wherein detection of the failure of the at least one antenna element includes a detection of an amount of failing antenna elements in the antenna array, and wherein applying the mitigation procedure comprises one or more of:

continuing to use a first codebook when the amount of failing antenna elements is within a first range; and switching to a second codebook when the amount of failing antenna elements is within a second range.

* * * * *